(12) United States Patent
Seo

(10) Patent No.: US 12,091,022 B2
(45) Date of Patent: Sep. 17, 2024

(54) RADAR SYSTEM FOR VEHICLES AND METHOD FOR OPERATING THE SAME

(71) Applicant: HYUNDAI MOBIS Co., Ltd., Seoul (KR)

(72) Inventor: Seung Hwan Seo, Suwon-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 420 days.

(21) Appl. No.: 17/523,252

(22) Filed: Nov. 10, 2021

(65) Prior Publication Data

US 2022/0144287 A1    May 12, 2022

(30) Foreign Application Priority Data

Nov. 11, 2020 (KR) .................. 10-2020-0150275
Nov. 11, 2020 (KR) .................. 10-2020-0150276

(51) Int. Cl.
*B60W 40/105* (2012.01)
*G01S 13/10* (2006.01)
*G01S 13/931* (2020.01)
*H04W 4/46* (2018.01)

(52) U.S. Cl.
CPC .......... *B60W 40/105* (2013.01); *G01S 13/10* (2013.01); *G01S 13/931* (2013.01); *H04W 4/46* (2018.02); *B60W 2420/408* (2024.01)

(58) Field of Classification Search
CPC .... G01S 13/931; G01S 13/343; G01S 13/345; G01S 13/347; G01S 7/023; G01S 7/23; G01S 7/0232; G01S 7/0235; H04W 4/46; H04W 4/44

USPC ........................................... 342/70, 112, 200
See application file for complete search history.

(56) References Cited

U.S. PATENT DOCUMENTS

| | | | | |
|---|---|---|---|---|
| 4,286,462 | A * | 9/1981 | Bourne | G01S 13/951 367/90 |
| 6,583,753 | B1 * | 6/2003 | Reed | G01S 13/931 342/72 |
| 7,400,290 | B2 * | 7/2008 | Woodington | G01S 7/414 342/107 |
| 7,663,537 | B2 * | 2/2010 | Suzuki | G01S 13/34 342/146 |
| 9,796,390 | B2 * | 10/2017 | Halder | G06T 7/70 |
| 10,031,232 | B2 * | 7/2018 | Zohar | G02B 26/10 |
| 10,404,261 | B1 * | 9/2019 | Josefsberg | G01S 13/931 |
| 10,439,555 | B2 * | 10/2019 | Saric | H03B 5/1212 |
| 10,605,911 | B1 * | 3/2020 | Parker | G01S 13/42 |
| 10,622,694 | B2 * | 4/2020 | Haroun | G01S 7/032 |
| 10,627,507 | B1 * | 4/2020 | Parker | H01Q 25/00 |

(Continued)

FOREIGN PATENT DOCUMENTS

| | | | | |
|---|---|---|---|---|
| JP | 4484895 | B2 * | 6/2010 | ....... G01S 2013/932 |
| KR | 10-2015-0010288 | A | 1/2015 | |
| KR | 10-2015-0051697 | A | 5/2015 | |

*Primary Examiner* — Vladimir Magloire
*Assistant Examiner* — Michael W Justice
(74) *Attorney, Agent, or Firm* — MORGAN, LEWIS & BOCKIUS LLP

(57) ABSTRACT

A radar system for vehicles includes an antenna for outputting a radar signal and receiving a radar signal reflected from a target, a radio frequency (RF) module for generating the radar signal and providing the radar signal to the antenna, and a radar microcontroller unit (MCU) for determining a waveform of the radar signal on the basis of driving information on a vehicle.

15 Claims, 7 Drawing Sheets

(56) References Cited

U.S. PATENT DOCUMENTS

| | | | |
|---|---|---|---|
| 10,712,437 B2* | 7/2020 | Han | G01S 13/582 |
| 11,077,756 B2* | 8/2021 | Natroshvili | B60L 15/00 |
| 11,294,029 B2* | 4/2022 | Longman | G01S 7/35 |
| 11,340,335 B2* | 5/2022 | Mahajan | G01S 7/497 |
| 11,726,201 B2* | 8/2023 | Schindler | G01S 13/58 342/25 B |
| 11,802,937 B2* | 10/2023 | Fang | G01S 13/931 |
| 11,841,416 B2* | 12/2023 | Al Kadi | G01S 7/03 |
| 2007/0152870 A1* | 7/2007 | Woodington | G01S 13/528 342/72 |
| 2008/0088498 A1* | 4/2008 | Suzuki | G01S 13/42 342/90 |
| 2016/0240907 A1* | 8/2016 | Haroun | G01S 13/931 |
| 2017/0247036 A1* | 8/2017 | Halder | B60W 40/02 |
| 2018/0113200 A1* | 4/2018 | Steinberg | G01S 7/4918 |
| 2018/0191302 A1* | 7/2018 | Saric | H03B 5/1243 |
| 2019/0011547 A1* | 1/2019 | Han | G01S 13/931 |
| 2019/0011548 A1* | 1/2019 | Han | G01S 13/582 |
| 2019/0047439 A1* | 2/2019 | Natroshvili | G06V 20/58 |
| 2020/0295430 A1* | 9/2020 | Haroun | G01S 7/032 |
| 2020/0333433 A1* | 10/2020 | Longman | G01S 7/35 |
| 2020/0333439 A1* | 10/2020 | Mahajan | G01S 7/4802 |
| 2020/0393552 A1* | 12/2020 | Fang | G01S 13/91 |
| 2021/0055734 A1* | 2/2021 | Yokev | G08G 1/163 |
| 2021/0208272 A1* | 7/2021 | Lavian | H03L 7/091 |
| 2021/0223379 A1* | 7/2021 | Al Kadi | G01S 13/931 |
| 2021/0405184 A1* | 12/2021 | Schindler | G01S 13/9029 |
| 2022/0043108 A1* | 2/2022 | Lavian | G01S 7/032 |
| 2022/0308204 A1* | 9/2022 | Zaidi | G01S 13/426 |
| 2022/0317241 A1* | 10/2022 | Aduru | H04W 72/541 |
| 2023/0184883 A1* | 6/2023 | Li | G01S 7/023 342/59 |

* cited by examiner

RADAR SYSTEM FOR VEHICLES AND METHOD FOR OPERATING THE SAME

CROSS-REFERENCE TO RELATED APPLICATION

This application claims the priority of Korean Patent Application No. 10-2020-0150276, filed on Nov. 11, 2020 and Korean Patent Application No. 10-2020-0150275. Filed on Nov. 11, 2020, in the Korean Intellectual Property Office, the disclosure of which is incorporated herein by reference.

BACKGROUND OF THE INVENTION

1. Field of the Invention

The present invention relates to a radar system for vehicles and a method for operating the same, and more specifically, to a radar system for vehicles and a method for operating the same which can secure appropriate radar performance according to a vehicle driving environment by changing an output waveform.

2. Description of the Related Art

With the recent growing interest in self-driving technology, research and development of radar systems used to detect a target around a vehicle and measure a distance to the detected target and a speed of the detected target are actively conducted.

Radar is a radio detection device that radiates radio waves and detects the presence of a target and a distance to the target using reflected waves from the target. The principle of operation of radar is to detect waves from a target to recognize the presence of the target.

As an algorithm for obtaining information on a moving target using the radar technology, a method of performing fast Fourier transform (FFT) on an output signal and a reflected signal having a chirp waveform in multiple domains to extract parameters related to a target, such as distance, speed, and angle is generally used.

Here, a bandwidth, a period, and the like of a chirp output waveform affect the performance of a radar system, such as a distance resolution, a speed resolution, and a maximum range of a target to be detected.

When a vehicle is traveling, different performances of a radar system may be required according to a surrounding environment of the vehicle or a state of the vehicle. For example, accurate measurement of a distance to a target rather than a speed of the target may be more helpful for vehicle driving in a specific situation.

Conventional radar systems use only a preset output waveform and thus a distance resolution or a speed resolution is constant. Accordingly, conventional radar systems cannot secure appropriate radar performance in accordance with a surrounding environment of a vehicle or a state of the vehicle.

It will be understood that the above matters described in the related art are merely for promotion of understanding of the background of the invention and should not be recognized as prior art well-known to those skilled in the art.

CITED REFERENCE

Patent Document (Patent Document 1) KR 10-2015-0010288 A
(Patent Document 2) KR 10-2015-0051697 A

SUMMARY OF THE INVENTION

Therefore, the present invention has been made in view of the above problems, and it is an object of the present invention to provide a radar system for vehicles and a method for operating the same which can secure appropriate radar performance according to a vehicle driving environment by changing an output waveform.

In accordance with an aspect of the present invention, the above and other objects can be accomplished by the provision of a radar system for a vehicle, including an antenna for outputting a radar signal and receiving a radar signal reflected from a target, a radio frequency (RF) module for generating the radar signal and providing the radar signal to the antenna, and a radar microcontroller unit (MCU) for determining a waveform of the radar signal on the basis of driving information on the vehicle.

In an embodiment of the present invention, the radar signal may have a waveform in which a chirp having a frequency bandwidth and a period is repeated.

In an embodiment of the present invention, the radar MCU may change the frequency bandwidth and the period of the chirp on the basis of the driving information on the vehicle.

In an embodiment of the present invention, the radar MCU may change the frequency bandwidth and the period of the chirp on the basis of whether the vehicle is located inside or outside a building or a result of comparison of a speed of the vehicle with a preset reference speed.

In an embodiment of the present invention, the radar MCU may increase the frequency bandwidth and the period of the chirp upon determining that the vehicle is located inside the building.

In an embodiment of the present invention, the radar MCU may change the frequency bandwidth and the period of the chirp on the basis of the result of comparison of the speed of the vehicle with the preset reference speed upon determining that the vehicle is located outside the building.

In an embodiment of the present invention, the radar MCU may increase the frequency bandwidth and the period of the chirp when the speed of the vehicle is less than the preset reference speed.

In accordance with another aspect of the present invention, there is provided a method for operating a radar system for a vehicle, including outputting a radar signal having a preset default waveform by the radar system installed in the vehicle when driving of the vehicle starts, determining whether the vehicle is located inside or outside a building by the radar system on the basis of position information received from a navigation system of the vehicle, and changing the default waveform and outputting a radar signal by the radar system upon determining that the vehicle is located inside the building.

In an embodiment of the present invention, the radar signal may have a waveform in which a chirp having a frequency bandwidth and a period is repeated.

In an embodiment of the present invention, the changing the default waveform and outputting the radar signal may include changing the default waveform by changing the frequency bandwidth and the period of the chirp by the radar system.

In an embodiment of the present invention, the changing the default waveform and outputting the radar signal may include changing the default waveform by increasing the frequency bandwidth and the period of the chirp by the radar system.

In an embodiment of the present invention, the method may further include comparing a speed of the vehicle with a preset reference speed and changing the default waveform on the basis of a comparison result by the radar system upon determining that the vehicle is located outside the building.

In an embodiment of the present invention, the comparing the speed of the vehicle with the preset reference speed and changing the default waveform on the basis of the comparison result may include changing the default waveform by increasing the frequency bandwidth and the period of the chirp if the speed of the vehicle is less than the reference speed.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE PREFERRED EMBODIMENTS

Hereinafter, a radar system for vehicles and a method for operating the same according to various embodiments of the present invention will be described with reference to the accompanying drawings.

Figure 1:
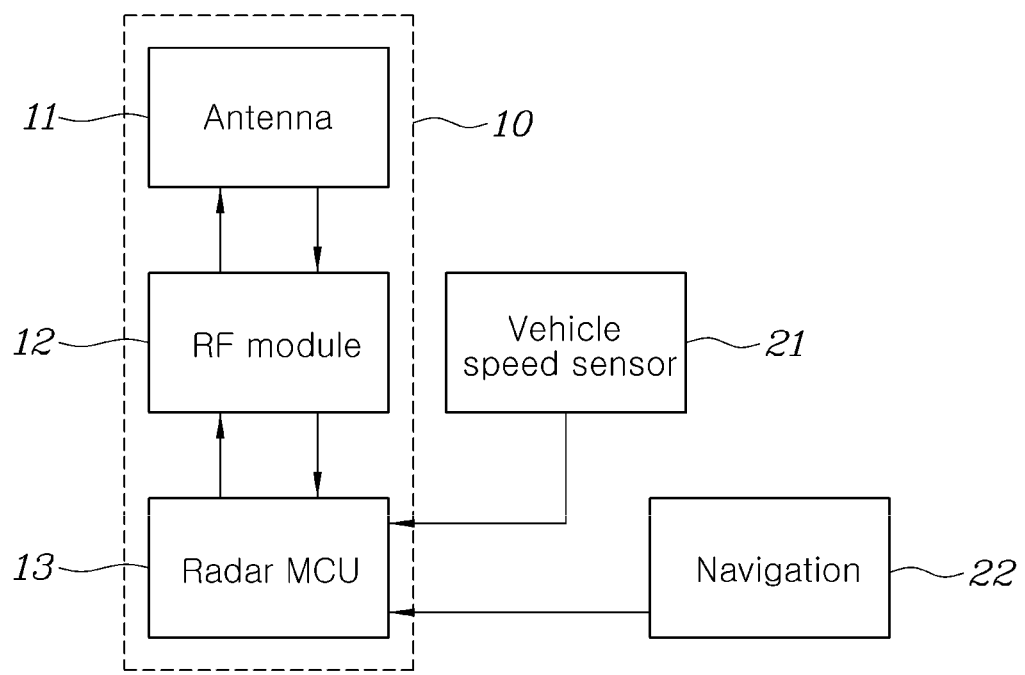
FIG. 1 is a block diagram illustrating a radar system for vehicles according to an embodiment of the present invention.

FIG. 1 is a block diagram illustrating a radar system for vehicles according to an embodiment of the present invention.

Referring to FIG. 1, the radar system 10 for a vehicle according to an embodiment of the present invention may include an antenna 11 for outputting a radar signal and receiving a signal reflected from a target, a radio frequency (RF) module 12 for modulating a specific signal and radiating radio waves through the antenna or demodulating a received RF signal, and a radar microcontroller unit (MCU) 13 for sampling the demodulated signal with a predetermined sampling frequency to convert the demodulated signal into digital data, processing the digital data, and calculating a distance to the target and a speed of the target using the processing result.

A radar applied to an embodiment of the present invention may be a frequency modulated continuous waveform (FMCW) radar.

In general, radar may be classified as a pulse radar, a continuous wave (CW) radar, an FMCW radar, and the like according to a signal waveform used therefor.

The FMCW radar uses a signal with a frequency modulated with time, estimates a distance to a target according to a beat frequency component that is a difference between a transmitted signal and a received signal, and derives a moving speed of the target according to a Doppler frequency component. In applications for detecting a moving object, a fast-chirp train modulation method for mitigating the influence of Doppler frequency variation on a beat frequency is mainly used.

Figure 2:
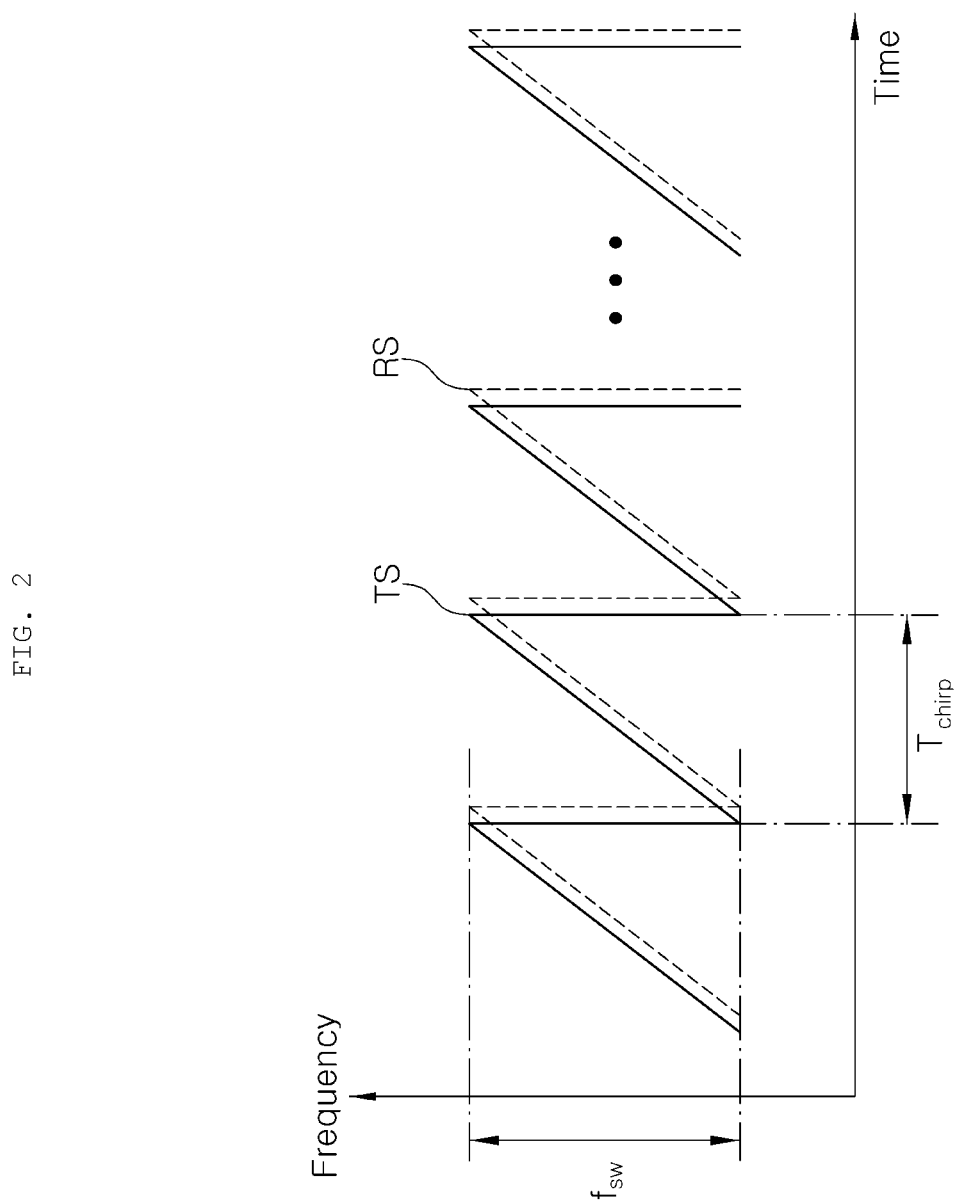
FIG. 2 is a diagram illustrating a waveform of a radar signal used in the radar system for vehicles according to an embodiment of the present invention.

FIG. 2 is a diagram illustrating a waveform of a radar signal used in the radar system for vehicles according to an embodiment of the present invention.

As described above, a radar applied to an embodiment of the present invention is the FMCW radar and may use a radar signal having consecutive chirps having a specific period and frequency bandwidth, as illustrated in FIG. 2. In FIG. 2, a solid line represents an output signal TS output from the antenna 11 of the radar system 10 to a target and a dotted line represents a received signal RS reflected from the target and received by the antenna 11 of the radar system 10.

In the radar signal waveform as illustrated in FIG. 2, the speed resolution of the radar system can increase as the number of chirps per hour increases. In addition, when chirps have a uniform period, the distance resolution of the radar system can become higher as the frequency bandwidth of the chirps becomes wider. Further, when chirps have a uniform bandwidth, the range of the radar system can increase as the period of chirps increases.

In embodiments of the present invention, the radar MCU 13 may receive vehicle speed information or vehicle position information from in-vehicle sensors or other controllers outside the radar system and adjust the radar performance by changing a radar signal waveform in the time-frequency domain, as illustrated in FIG. 2, according to the received information.

For example, as illustrated in FIG. 1, the radar system 10 according to an embodiment of the present invention may receive vehicle speed information from a vehicle speed sensor 21 of the vehicle and receive vehicle position information from a navigation system 22 of the vehicle.

The radar MCU 13 may change a radar signal waveform, that is, the period or the frequency bandwidth of chirps, on the basis of information received from the vehicle speed sensor 21 or the navigation system 22.

Figure 3:
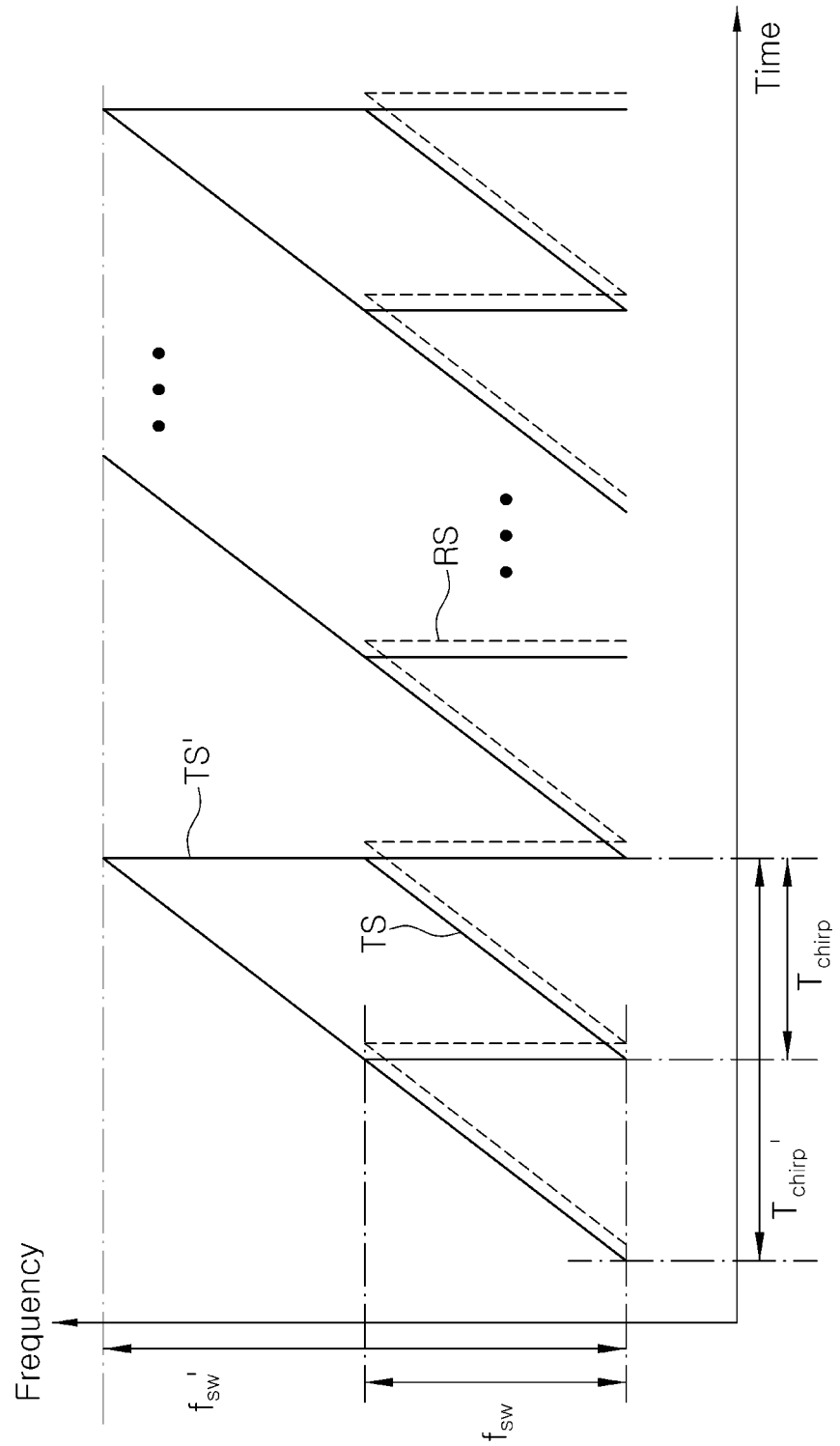
FIG. 3 is a diagram illustrating a changed waveform of a radar signal used in the radar system for vehicles according to an embodiment of the present invention.

FIG. 3 is a diagram illustrating a changed waveform of a radar signal used in the radar system for vehicles according to an embodiment of the present invention.

Specifically, in the radar system for vehicles according to an embodiment of the present invention, the radar MCU 13 may receive vehicle position information from the navigation system 22 and determine whether the vehicle is located insider or outside a building. When the vehicle is located inside a building, the speed of the vehicle is very low. When the vehicle stops or the speed of the vehicle is very low, speed information on the vehicle may be lost and thus the detection performance of the radar system may deteriorate. In an embodiment of the present invention, the radar MCU 13 may generate a radar signal waveform in which a chirp period has increased ($T_{chirp} \rightarrow T_{chirp'}$) and a chirp frequency bandwidth has increased ($f_{sw} \rightarrow f_{sw'}$), as illustrated in FIG. 3 upon determining that the vehicle is located inside a building. For example, if the radar signal waveform illustrated in FIG. 2 is a default waveform, it is possible to double the chirp period and to double the chirp frequency bandwidth as illustrated in FIG. 3.

Since digital conversion is performed in a predetermined period per chirp in a default waveform in a general radar system, the number of times of sampling per chirp becomes twice the default waveform when the chirp period is doubled. That is, it is possible to improve the distance resolution without reducing a maximum range by doubling the chirp frequency bandwidth and the chirp period to double the number of times of sampling.

If only the chirp frequency bandwidth is doubled without changing the chirp period, the maximum range decreases because the number of times of sampling does not change although the frequency bandwidth becomes wider. In an embodiment of the present invention, however, it is possible to improve the distance resolution without reducing the maximum range by increasing the chirp period along with the chirp frequency bandwidth. Particularly, when the detection performance may deteriorate due to decrease in the vehicle speed, the radar system according to an embodiment of the present invention can improve the distance resolution to offset deterioration of detection performance due to speed reduction in return for increasing the chirp period to deteriorate speed detection accuracy due to reduction in the number of chirps per hour.

In the radar system for vehicles according to an embodiment of the present invention, upon determining that the vehicle is located outside a building according to vehicle position information from the navigation system 22, the radar MCU 13 may receive information on a vehicle speed from the vehicle speed sensor 21 and change the radar signal waveform to a waveform in which both the chirp period and the chirp frequency bandwidth have increased as illustrated in FIG. 3 when the vehicle stops or the vehicle speed is lower than a preset reference speed close to a stop state.

On the other hand, when the vehicle is determined to be located outside a building according to the vehicle position information from the navigation system 22 and the vehicle speed received from the vehicle speed sensor 21 is the reference speed or higher, the radar MCU 13 may output a radar signal with chirps having the default period and the default frequency bandwidth as illustrated in FIG. 2.

Figure 4:
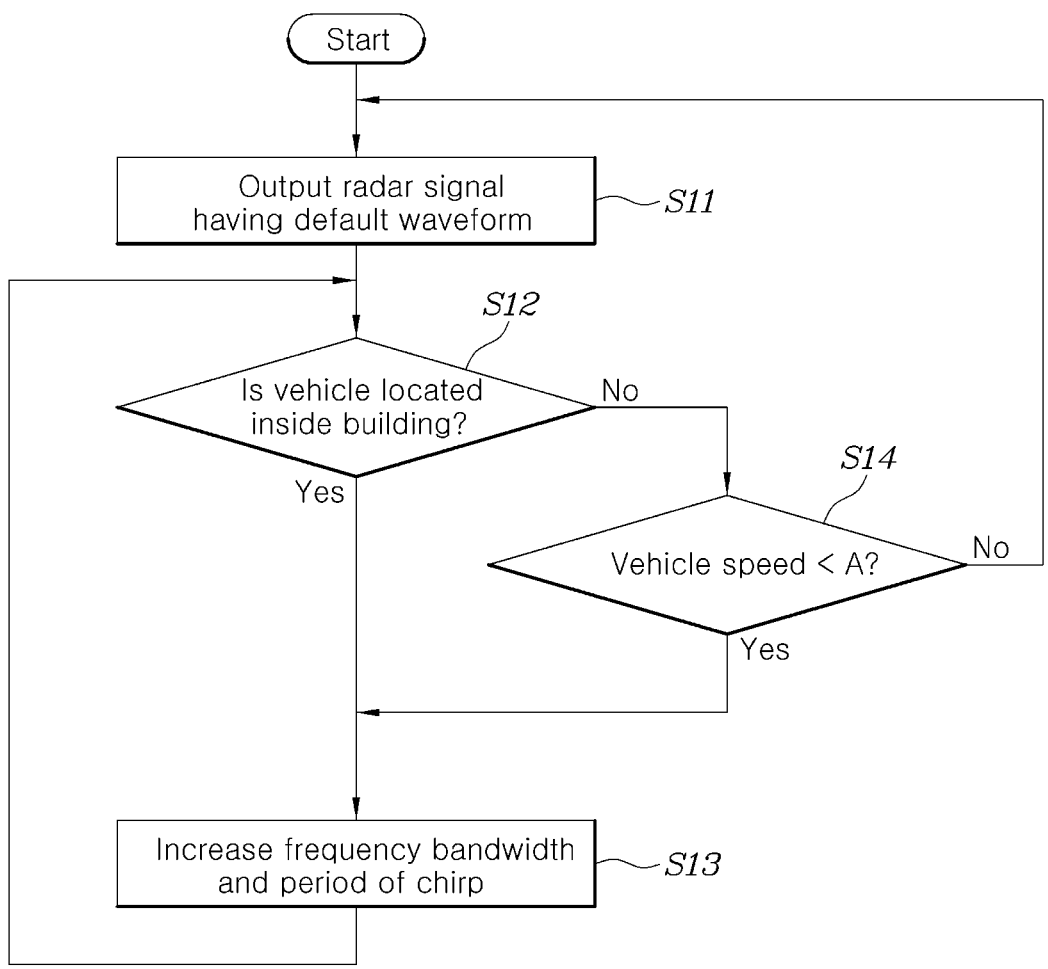
FIG. 4 is a flowchart illustrating a method for operating the radar system for vehicles according to an embodiment of the present invention.

FIG. 4 is a flowchart illustrating a method for operating the radar system for vehicles according to an embodiment of the present invention.

Referring to FIG. 4, in the method for operating the radar system for vehicles according to an embodiment of the present invention, the radar MCU 13 of the radar system 10 may output a radar signal with a waveform including chirps having a preset frequency bandwidth and period, as illustrated in FIG. 2, to operate the radar system 10 when driving of the vehicle starts (S11).

Subsequently, the radar MCU 13 may determine whether the vehicle is located inside a building using position information of the vehicle received from the navigation system 22 of the vehicle (S12).

The radar MCU 13 may change the waveform of the radar signal upon determining that the vehicle is located inside a building (S13). As described above, the radar MCU 13 may increase the frequency bandwidth and the period of the chirps included in the radar signal. Accordingly, it is possible to improve distance detection accuracy, that is, distance resolution, while maintaining a maximum range in return for reducing speed detection accuracy less important in indoor spaces.

Upon determining that the vehicle is located outside a building in step S12, the radar MCU 13 may receive information on the vehicle speed from the vehicle speed sensor 21 and compare the received vehicle speed with a preset reference speed A (S14). If the vehicle speed is less than the preset reference speed, the radar MCU 13 may increase the frequency bandwidth and the period of the chirps included in the radar signal in step S13.

If the vehicle speed is the reference speed A or higher in step S14, the radar MCU 13 may continuously output the radar signal with the default waveform to operate the radar system (S11).

Hereinafter, a radar system for vehicles and a method for operating the same according to another embodiment will be described in detail with reference to the attached drawings.

Figure 5:
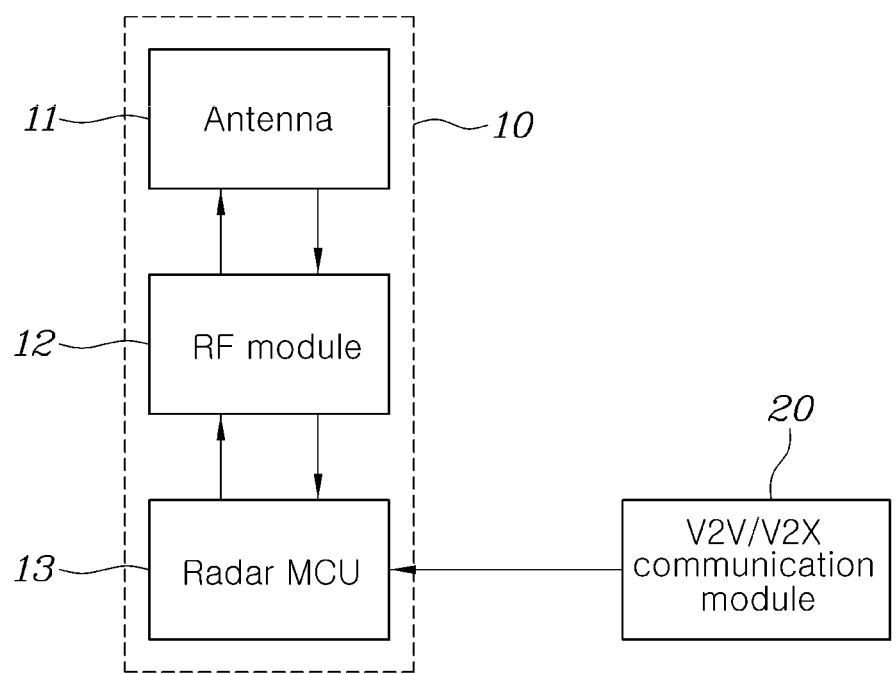
FIG. 5 is a block diagram illustrating a radar system for vehicles according to another embodiment of the present invention.

FIG. 5 is a block diagram illustrating a radar system for vehicles according to another embodiment of the present invention.

Referring to FIG. 5, the radar system for vehicles according to another embodiment of the present invention may include a radar module 10 including an antenna 11 for outputting a radar signal and receiving a signal reflected from a target, a radio frequency (RF) module 12 for modulating a specific signal and radiating radio waves through the antenna or demodulating a received RF signal, and a radar microcontroller unit (MCU) 13 for sampling the demodulated signal with a predetermined sampling frequency to convert the demodulated signal into digital data, processing the digital data, and calculating a distance to the target and a speed of the target using the processing result, and a communication module 20 for receiving radar operation information of neighboring vehicles of the host vehicle through vehicle-to-vehicle (V2V) or vehicle-to-everything (V2X) communication.

Particularly, in an embodiment of the present invention, the radar MCU 13 in the radar module 10 may check radar signal waveforms of neighboring vehicles and set a radar signal waveform such that interference between the radar signal waveform and radar signals of the neighboring vehicles does not occur, and the RF module 12 may output the radar signal waveform set by the radar MCU 13.

In a radar signal waveform as illustrated in FIG. 2, the number of chirps in a radar signal output one time, that is, a chirp period $T_{chirp}$, and a chirp frequency bandwidth $f_{sw}$ may be predetermined. Accordingly, in the embodiment of the present invention, the radar MCU 13 may determine a radar signal waveform such that the chirp frequency bandwidth and a radar signal output time do not overlap radar signal waveforms of neighboring vehicles with reference to information on the radar signal waveforms of the neighboring vehicles received through the communication module 20 to prevent occurrence of interference between the set radar signal waveform and radar signals of the neighboring vehicles.

Specifically, since the frequency bandwidth is a preset value, the radar MCU 13 may change a frequency $f_0$ at which the frequency band starts or change a time $T_0$ at which output of the radar signal starts and output a radar signal in a frequency band and time in which interference between the radar signal of the host vehicle and radar signals of neighboring vehicles does not occur to perform target detection.

Figure 6:
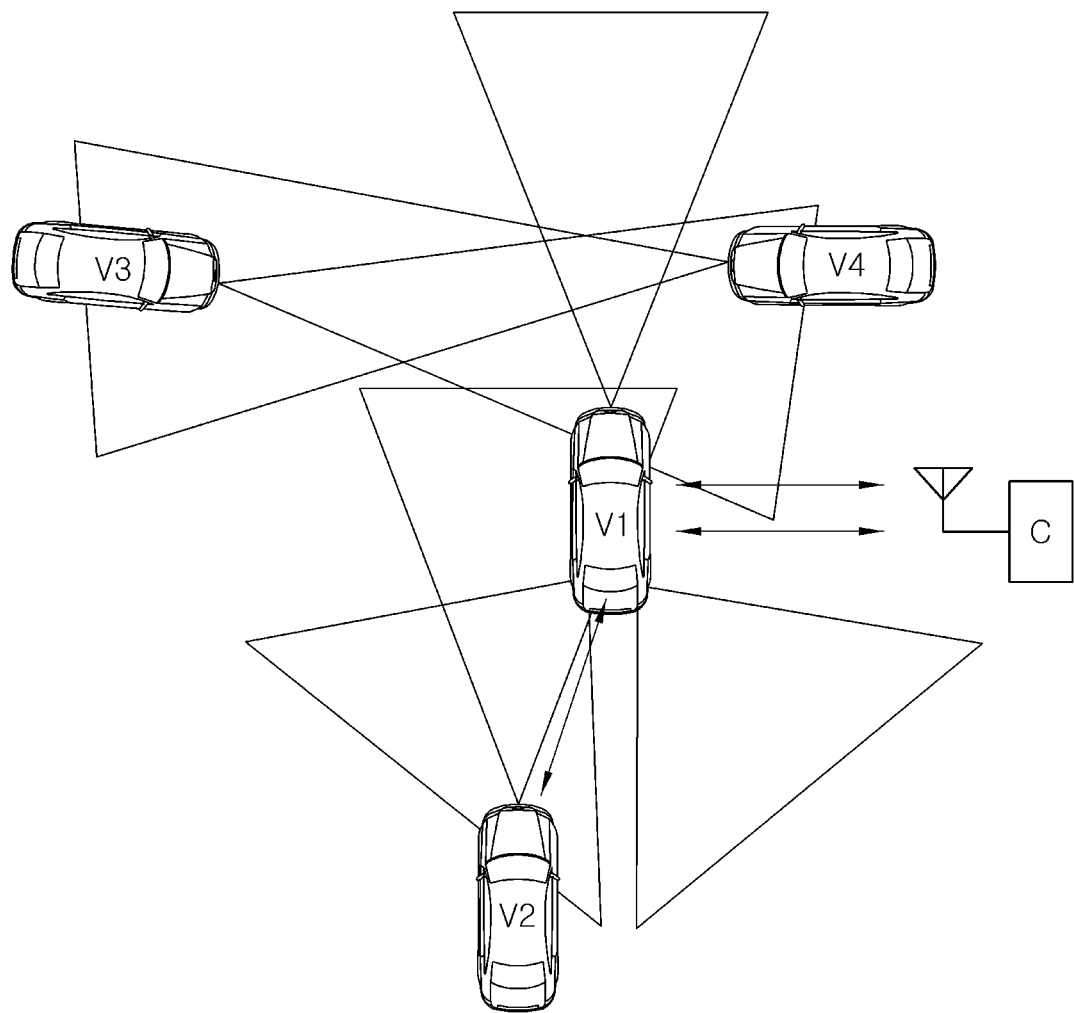
FIG. 6 is a diagram illustrating a situation in which radar signal interference between a vehicle to which the radar system for vehicles according to the embodiment of FIG. 5 is applied and neighboring vehicles is prevented.

FIG. 6 is a diagram illustrating a situation in which radar signal interference between a host vehicle to which the radar system for vehicles according to another embodiment of the present invention is applied and neighboring vehicles is prevented.

When neighboring vehicles V2 to V4 are operating radars while a host vehicle V1 is traveling using a radar, if the vehicles V1 to V4 use the same radar module or use radar signals having waveforms in similar frequency bands, interference between the radar signals may occur and thus the radars may malfunction.

To prevent mutual interference between radar signals transmitted/received between vehicles, the communication module 20 in the radar system may receive radar operation information of neighboring vehicles, particularly, chirp frequency bandwidths that are information on radar signal waveforms used in radar systems of the neighboring vehicles and information on radar signal transmission times of the neighboring vehicles through V2V communication with the neighboring vehicles. FIG. 6 illustrates an example in which the host vehicle V1 and the neighboring vehicle V2 exchange radar operation information through V2V communication.

In addition, the communication module 20 in the radar system may receive radar operation information of vehicles traveling around the host vehicle V1 in an area where the host vehicle V1 is traveling through a V2X transceiver C installed around the road on which the host vehicle V1 is traveling. The V2X transceiver C may receive radar operation information of vehicles traveling therearound from the vehicles, transmit the radar operation information to a traffic management server, receive radar operation information of the vehicles from the traffic management server, and provide the radar operation information to the vehicles. In FIG. 6, the host vehicle V1 may receive radar operation information of the neighboring vehicles V3 and V4 from the V2X transceiver C.

Radar operation information of neighboring vehicles received through the communication module 20 provided in the host vehicle V1 may be provided to the radar MCU 13 of the radar module 10.

The radar MCU 13 may receive radar operation information of the neighboring vehicles V2 to V4, that is, information on chirp frequency bandwidths of radar signal waveforms used in the neighboring vehicles and radar signal output times, and set a radar signal waveform used in the host vehicle V1 such that a frequency band of the radar signal waveform and a radar signal output time do not overlap those of the neighboring vehicles. That is, the radar MCU 13 may set a frequency value $f_0$ at which the frequency band of chirps in the radar signal waveform starts such that it does not overlap radar signal waveforms of neighboring vehicle or set a time $T_0$ at which the radar signal waveform starts such that it does not overlap the radar signal waveforms of the neighboring vehicles to set a frequency signal waveform that does not interfere with radar signals from the neighboring vehicles.

The radar MCU 13 may provide information on the set radar signal waveform to the RF module 12, and the RF module 12 may generate the set radar signal waveform and transmit the same to the antenna 11 to allow the antenna 11 to output a radar signal.

As described above, the radar system for vehicles according to another embodiment of the present invention can receive radar operation information of neighboring vehicles, that is, information on frequency bands of radar signal waveforms and radar signal output times, through V2V or V2X communication and generate a radar signal waveform such that a frequency band thereof and a radar signal output time do not overlap those of the neighboring vehicles to prevent occurrence of interference between a radar signal of the host vehicle and radar signals of the neighboring vehicles and prevent radar malfunction, contributing to safe driving.

Figure 7:
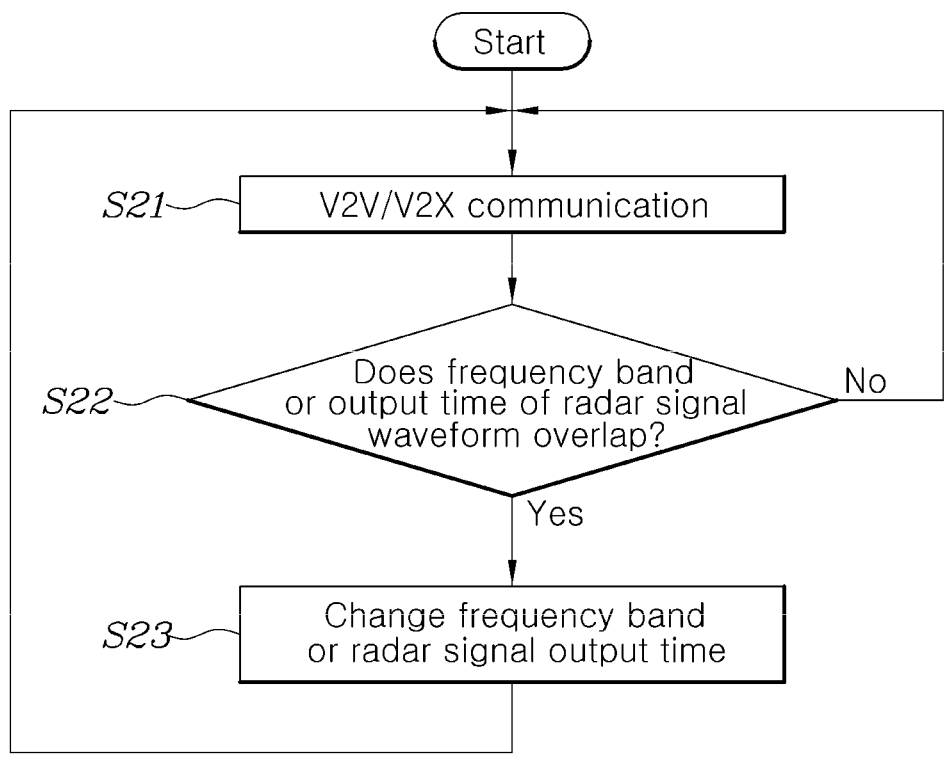
FIG. 7 is a flowchart illustrating a method for operating the radar system for vehicles according to the embodiment of FIG. 5.

FIG. 7 is a flowchart illustrating a method for operating the radar system for vehicles according to another embodiment of the present invention.

Referring to FIG. 7, in the method for operating the radar system for vehicles according to another embodiment of the present invention, the communication module 20 may receive radar operation information of neighboring vehicles, that is, information on frequency bands of radar signal waveforms and radar signal output times of the neighboring vehicles, through V2V or V2X communication and provide the received radar operation information to the radar MCU 13 of the radar module 10 while the host vehicle is traveling (S21).

Subsequently, the radar MCU 13 may receive the information on the frequency bands of the radar signal waveforms used in the neighboring vehicles and radar signal output times of the neighboring vehicles and check whether a frequency band of a preset radar signal waveform and a radar signal output time of the host vehicle overlap the frequency bands of the radar signal waveforms and the radar signal output times of the neighboring vehicles to cause occurrence of interference (S22).

If the frequency band of the preset radar signal waveform and the radar signal output time of the host vehicle do not overlap those of the neighboring vehicles in step S22, the preset radar signal waveform may be generated and output.

If the frequency band of the preset radar signal waveform and the radar signal output time of the host vehicle overlap those of the neighboring vehicles in step S22, the radar MCU 13 may reset a radar signal waveform such that a frequency band of the radar signal waveform and a radar signal output time do not overlap those of the neighboring vehicle (S23). That is, the radar MCU 13 may set a frequency value $f_0$ at which the frequency band of chirps in the radar signal waveform starts such that it does not overlap the radar signal waveforms of the neighboring vehicle or set a time $T_0$ at which the radar signal waveform starts such that it does not overlap the radar signal waveforms of the neighboring vehicles to set a frequency signal waveform that does not interfere with radar signals from the neighboring vehicles.

The radar MCU 13 may provide information on the set radar signal waveform to the RF module 12, and the RF module 12 may generate the set radar signal waveform and transmit the same to the antenna 11 to allow the antenna 11 to output a radar signal in step S23.

Although the preferred embodiments of the present invention have been disclosed for illustrative purposes, those skilled in the art will appreciate that various modifications, additions and substitutions are possible, without departing from the scope and spirit of the invention as disclosed in the accompanying claims. For example, the radar MCU 13 may include a processor or a microprocessor. The radar MCU 13 may also include a computer readable recording medium storing computer readable code, algorithm, or software. The processors/microprocessor may perform functions, operations, steps, etc., described with reference to the radar MCU 13, when executing the computer readable code, algorithm, or software stored on the computer readable recording medium.

According to the above-described radar system for vehicles and the method for operating the same, it is possible to appropriately control the performance of the radar system in consideration of a vehicle driving state.

More specifically, according to the above-described radar system for vehicles and the method for operating the same, it is possible to improve distance resolution without reducing a maximum range by increasing both a chirp frequency bandwidth and a chirp period when a vehicle speed is low.

Particularly, according to the above-described radar system for vehicles and the method for operating the same, it is possible to improve distance resolution to offset deterioration of detection performance due to speed reduction in return for increasing the chirp period to deteriorate speed detection accuracy due to reduction in the number of chirps per hour when detection performance may deteriorate due to decrease in vehicle speed.

Effects which may be obtained by the present invention are not limited to the above-described effects, and various other effects may be evidently understood by those skilled in the art to which the present invention pertains from the following description.

What is claimed is:

1. A radar system for a vehicle, comprising:
   an antenna for outputting a radar signal and receiving a radar signal reflected from a target;
   a radio frequency (RF) module for generating the radar signal and providing the radar signal to the antenna; and
   a radar microcontroller unit (MCU) for determining a waveform of the radar signal on the basis of driving information on the vehicle and changing a frequency bandwidth and a period of a chirp of the waveform on the basis of a result of comparison of a speed of the vehicle with a preset reference speed in response to determining that the vehicle is located outside a building.

2. The radar system for vehicles according to claim 1, wherein the chirp having the frequency bandwidth and the period is repeated.

3. The radar system for vehicles according to claim 1, wherein the radar MCU also changes the frequency bandwidth and the period of the chirp in response to determining that the vehicle is located inside the building.

4. The radar system for vehicles according to claim 3, wherein the radar MCU increases the frequency bandwidth and the period of the chirp in response to determining that the vehicle is located inside the building.

5. The radar system for vehicles according to claim 1, wherein the radar MCU increases the frequency bandwidth and the period of the chirp when the speed of the vehicle is less than the preset reference speed.

6. The radar system for vehicles according to claim 1, further comprising a communication module for receiving radar operation information of neighboring vehicles, wherein the radar MCU sets a frequency band of the radar signal waveform or a radar signal output start time on the basis of the radar operation information received through the communication module.

7. The radar system for vehicles according to claim 6, wherein the communication module receives the radar operation information of the neighboring vehicles through V2V communication or V2X communication.

8. The radar system for vehicles according to claim 6, wherein the radar operation information of the neighboring vehicles includes frequency bands of radar signal waveforms used in the neighboring vehicles and radar signal output start times of the neighboring vehicles.

9. The radar system for vehicles according to claim 8, wherein the radar MCU sets the frequency band of the radar signal waveform or the radar signal output start time such that the frequency band of the radar signal waveform or the radar signal output start time does not overlap the frequency bands of the radar signal waveforms used in the neighboring vehicles or the radar signal output start times of the neighboring vehicles.

10. The radar system for vehicles according to claim 9, wherein the radar MCU sets a frequency at which the frequency band of the radar signal waveform starts or the radar signal output start time such that the frequency band of the radar signal waveform or the radar signal output time does not overlap the frequency bands of the radar signal waveforms used in the neighboring vehicles or the radar signal output times of the neighboring vehicles.

11. A method for operating a radar system for a vehicle, comprising:
    outputting a radar signal having a preset default waveform by the radar system installed in the vehicle when driving of the vehicle starts;
    determining that the vehicle is located outside a building by the radar system on the basis of position information received from a navigation system of the vehicle;
    in response to determining that the vehicle is located outside the building, comparing a speed of the vehicle with a preset reference speed;
    determining that the comparison satisfies a condition; and
    in response to determining that the comparison satisfies a condition, changing the default waveform and outputting a radar signal.

12. The method according to claim 11, wherein the radar signal has a waveform in which a chirp having a frequency bandwidth and a period is repeated.

13. The method according to claim 12, wherein the changing the default waveform and outputting the radar signal comprises changing the default waveform by changing the frequency bandwidth and the period of the chirp by the radar system.

14. The method according to claim 12, wherein the changing the default waveform and outputting the radar signal comprises changing the default waveform by increasing the frequency bandwidth and the period of the chirp by the radar system.

15. The method according to claim 11, wherein the comparing the speed of the vehicle with the preset reference speed and changing the default waveform on the basis of the comparison result comprises changing the default waveform by increasing the frequency bandwidth and the period of the chirp if the speed of the vehicle is less than the reference speed.

* * * * *